Nov. 27, 1923.
J. CAIRNES
1,475,427
CUSHION TIRE OF THE CHAMBER TYPE
Filed Oct. 5, 1920
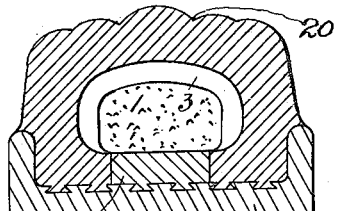
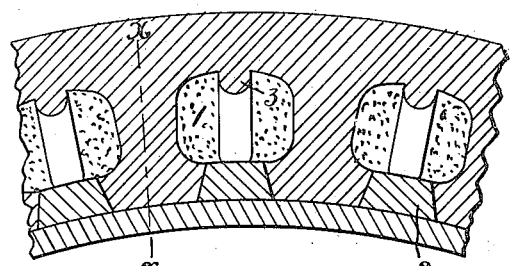
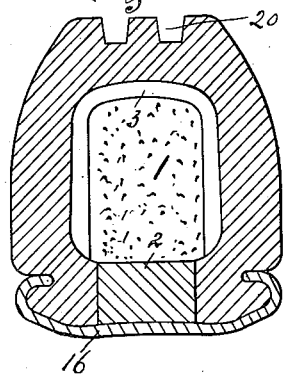
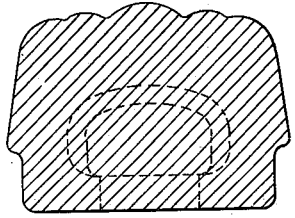
Witnesses.
W. C. P. Bayly.
E. W. Bayly.
Inventor:
John Cairnes
per Colin Pitt Bayly,
Attorney.

Patented Nov. 27, 1923.

1,475,427

UNITED STATES PATENT OFFICE.

JOHN CAIRNES, OF SOUTH NORWOOD, ENGLAND.

CUSHION TIRE OF THE CHAMBER TYPE.

Application filed October 5, 1920. Serial No. 414,880.

*To all whom it may concern:*

Be it known that I, JOHN CAIRNES, a subject of the King of Great Britain, residing at 61 Clifton Road, South Norwood, in the county of London, in England, have invented new and useful Improvements in and Relating to a Cushion Tire of the Chamber Type, of which the following is a specification.

This invention relates to cellular band or like tires for vehicle wheels, such tires being capable of taking the place of solid and tubular pneumatic tires without altering the wheel or wheel rim and comprises a simple and inexpensive construction while at the same time retaining the resiliency of continuous tube pneumatic tires According to this invention, the tire is provided with a succession of chambers located substantially central therein, each chamber being isolated from the others and having a single and continuous transverse arched or like rib running from side to side and across the roof thereof, this rib being of substantially the same cross sectional area and form throughout its length and closure plugs for sealing the chambers, and the tire as constructed vulcanized to a rim.

Reference is directed to the accompanying drawings in which I have illustrated the invention.

Fig. 1, is a cross section of my improved tire for commercial vehicles; Fig. 2, is a longitudinal section of the same; Fig. 3, is a cross section of my improved tire suitable for light vehicles; and Fig. 4, is a cross section of the tire on line *x x* of Fig. 2, before connection to the rim.

Within the body of the tire is a number of chambers 1 having openings at the base in each of which is fitted a closure plug 2 of ebonite or other suitable material. As shown in the drawings, these openings are of relatively large dimensions, to allow of the fitting of a large stiffening plug, and the dimension of such opening also facilitates the withdrawal of the forming mould from the chamber. The chambers 1 are each formed with a continuous arched rib 3 running transversely around the boundary walls and roof whereby the tire is reinforced and prevented from spreading outwardly and causing friction and cracking of the tire. The chambers may either be hollow or be filled with soft spongy rubber.

I claim:

A cushion tire comprising a rubber body portion, a series of chambers formed in the body portion, a series of relatively large openings in the base of the body portion one in alignment with each chamber and communicating therewith, a stiffening and closing plug in each opening to seal the chambers after moulding and a single continuous arched rib formed integral with the body portion and extending transversely across the outer portion of each chamber, said rib springing from points adjacent the inner face of the closing plug and being of substantially uniform cross sectional area throughout its length, the said tire being vulcanized to a rim.

JOHN CAIRNES.